US008084273B2

(12) United States Patent
Mirkin et al.

(10) Patent No.: US 8,084,273 B2
(45) Date of Patent: Dec. 27, 2011

(54) UNIVERSAL MATRIX

(75) Inventors: Chad A. Mirkin, Wilmette, IL (US);
Dorota Rozkiewicz, Gdańsk (PL);
Andrew J. Senesi, Chicago, IL (US)

(73) Assignee: Northwestern University, Evanston, IL (US)

( * ) Notice: Subject to any disclaimer, the term of this patent is extended or adjusted under 35 U.S.C. 154(b) by 401 days.

(21) Appl. No.: 12/140,793

(22) Filed: Jun. 17, 2008

(65) Prior Publication Data

US 2010/0048427 A1 Feb. 25, 2010

Related U.S. Application Data

(60) Provisional application No. 60/945,164, filed on Jun. 20, 2007, provisional application No. 60/929,314, filed on Jun. 21, 2007, provisional application No. 61/047,642, filed on Apr. 24, 2008, provisional application No. 61/055,045, filed on May 21, 2008.

(51) Int. Cl.
*G01N 1/00* (2006.01)

(52) U.S. Cl. ............. 436/180; 436/174; 436/94; 436/86

(58) Field of Classification Search .................. None
See application file for complete search history.

(56) References Cited

U.S. PATENT DOCUMENTS

| | | | |
|---|---|---|---|
| 5,114,477 A | 5/1992 | Mort et al. | |
| 5,948,621 A | 9/1999 | Turner et al. | |
| 6,635,311 B1 | 10/2003 | Mirkin et al. | |
| 6,827,979 B2 | 12/2004 | Mirkin et al. | |
| 2002/0076927 A1 | 6/2002 | Henderson et al. | |
| 2002/0122873 A1 | 9/2002 | Mirkin et al. | |
| 2003/0005755 A1 | 1/2003 | Schwartz | |
| 2003/0007242 A1 | 1/2003 | Schwartz | |
| 2003/0068446 A1 | 4/2003 | Mirkin et al. | |
| 2003/0157254 A1 | 8/2003 | Mirkin et al. | |
| 2003/0162004 A1 | 8/2003 | Mirkin et al. | |
| 2004/0028804 A1 | 2/2004 | Anderson | |
| 2004/0185445 A1 | 9/2004 | Fang | |
| 2005/0009206 A1 | 1/2005 | Mirkin et al. | |
| 2005/0035983 A1 | 2/2005 | Cruchon-Dupeyrat et al. | |
| 2005/0078158 A1 | 4/2005 | Magdassi et al. | |
| 2005/0235869 A1 | 10/2005 | Cruchon-Dupeyrat et al. | |
| 2005/0255237 A1* | 11/2005 | Zhang et al. ................ | 427/180 |
| 2006/0177585 A1 | 8/2006 | Takagi et al. | |
| 2006/0242740 A1 | 10/2006 | Collier et al. | |
| 2007/0065947 A1 | 3/2007 | Dong et al. | |
| 2007/0087172 A1 | 4/2007 | Mirkin et al. | |
| 2009/0143246 A1 | 6/2009 | Mirkin et al. | |

FOREIGN PATENT DOCUMENTS

| | | |
|---|---|---|
| EP | 1580554 A1 | 9/2005 |
| EP | 1614461 A2 | 1/2006 |
| WO | WO 99/05308 A | 2/1999 |
| WO | WO 03/048314 A2 | 6/2003 |
| WO | WO 2004/010074 A2 | 1/2004 |
| WO | WO 2004/039487 A | 5/2004 |
| WO | WO 2006/035923 A1 | 4/2006 |
| WO | WO 2008/157550 A2 | 12/2008 |

OTHER PUBLICATIONS

Folger, R. et al. "Translational Movements of Macrophages Through Media of Different Viscosities." Journal of Cell Science (1978) 31 245-257.*
Jung, Hyungil et al. "Dip-Pen Nanolithography of Reactive Alkoxysilanes on Glass." Journal of the American Chemical Society (2003) 125 12096-12097.*
Li, Bin et al. "Fabricating protein nanopatterns on a single DNA molecule with Dip-pen nanolithography." Ultramicroscopy (2005) 105 312-315.*
Williams, Pauline. "Nutrition and Food Activities for Kids." Accessed by the examiner on Jan. 6, 2011 at <http://web.archive.org/web/*/http://extension.usu.edu/saltlake/files/uploads/pdf/NutritionActivitiesForKids.pdf> which was achived on Jan. 12, 2007 by the Internet Archive.*
Zhang, Tianhong et al. "Novel Polysaccharide Surfactants: Synthesis of Model Compounds and Dextran-Based Surfactants." Macromolecules (1994) 27 7302-7308.*
PCT/US2008/067234, filed Jun. 17, 2008, International Search Report and Written Opinion (May 29, 2009)(14 pages).
Mark Schena et al., Quantitative Monitoring of Gene Expression Patterns With a Complementary DNA Microarray, Science, vol. 270, Oct. 20, 1995, pp. 467-470.
Gavin MacBeath et al, Printing Proteins as Microarrays for High-Throughput Function Determination, Science, vol. 289, Sep. 8, 2000, pp. 1760-1763.
David J. Lockhart et al., Genomics, Gene Expression and DNA Arrays, Nature, vol. 405, Jun. 15, 2000, pp. 827-836.
Karen L. Christman et al., Nanopatterning Proteins and Peptides, Soft Matter, 2, 2006, pp. 928-939.
Ki-Bum Lee et al., Protein Nanoarrays Generated by Dip-Pen Nanolithography, Science, vol. 295, Mar. 1, 2002, pp. 1702-1705.
Rafael A. Vega et al, Nanoarrays of Single Virus Particles, Angewandte Chemie, 44, 2005, pp. 6013-6015.
L. M. Demers et al., Direct Patterning of Modified Oligonucleotides on Metals and Insulators by Dip-Pen Nanolithography, Science, Vo. 296, Jun. 7, 2002, pp. 1836-1838.
Ki-Bum Lee et al., Protein Nanostructures Formed via Direct-Write Dip-Pen Nanolithography, J. Am. Chem. Soc., 125, 2003, p. 5588-5589.
Jung-Hyurk Lim et al., Direct-Write Dip-pen Nanolithography of Proteins on Modified Silicon Oxide Surfaces, Angewandte Chemie, 42, 2003, pp. 2309-2312.
Chien-Ching Wu et al., Porous Multilayer-Coated AFM Tips for Dip-Pen Nanolithography of Proteins, J. Am. Shem. Soc., 131, 2009, pp. 7526-7527.

(Continued)

Primary Examiner — Yelena G Gakh
Assistant Examiner — Christopher A Hixson
(74) Attorney, Agent, or Firm — Foley & Lardner LLP

(57) ABSTRACT

The application relates to a method of depositing a patterning species from a nanoscopic tip to a substrate surface. The method is carried out at a sufficiently high humidity to facilitate the deposition. The deposition of the patterning species is facilitated by a polysaccharide carrier as well as an additional additive.

53 Claims, 10 Drawing Sheets

OTHER PUBLICATIONS

Yih Horng Tan et al., A Nanoengineering Approach for Investigation and Regulation of Protein Immobilization, ACS NANO, vol. 2, No. 11, 2008, pp. 2374-2384.

Antoine Pallandre et al., Binary Nanopatterned Surfaces Prepared From Silane Monolayers, Nano Letters, vol. 4, No. 2, 2004, pp. 365-371.

J. P. Renault et al., Fabricating Arrays of Single Protein Molecules on Glass using Microcontact Printing, J. Phys. Chem. B, vol. 107, No. 3, 2003, pp. 703-711.

J. Damon Hoff et al., Nanoscale Protein Patterning by Imprint Lithography, Nano Letters, vol. 4, No. 5, 2004, pp. 853-857.

Richard D. Piner et al., "Dip-Pen" Nanolithography, Science, vol. 283, Jan. 29, 1999, pp. 661-663.

David S. Ginger et al., The Evolution of Dip-Pen Nanolithography, Angewandte Chemie, 43, 2004, pp. 30-45.

Khalid Salaita et al., Applications of Dip-Pen Nanolithography, Nature Nanotechnology, vol. 2, Mar. 2007, pp. 145-155.

Fengwei Huo et al., Polymer Pen Lithography, Science, vol. 321, Sep. 19, 2008, pp. 1658-1660.

Hesham Taha et al., Protein Printing With an Atomic Force Sensing Nanofountainpen, Applied Physics Letters, vol. 83, No. 5, Aug. 4, 2003, pp. 1041-1043.

Adam B. Braunschweig et al., Redox-Activating Dip-Pen Nanolithography (RA-DPN), J. Am. Chem., Soc., 131, 2009, pp. 922-923.

Rafael A. Vega et al., Functional Antibody Arrays Through Metal Ion-Affinity Templates, ChemBioChem, 7, 2006, pp. 1653-1657.

Wechng Maria Wang et al., Direct Patterning of Gold Nanoparticles Using Dip-Pen Nanolithography, ACS NANO, vol. 2, No. 10, 2008, pp. 2135-2142.

Sylwia Sekula et al., Multiplexed Lipid Dip-Pen Nanolithography on Subcellular Scales for the Templating of Functional Proteins and Cell Culture, Small, 4, No. 10, 2008, pp. 1785-1793.

Valery Normand et al., New Insight Into Agarose Gel Mechanical Properties, Biomacromolecules, 1, 2000, pp. 730-738.

D. A. Rees, Shapely Polysaccharides, The Biochemical Journal, vol. 126, No. 2, 1972, pp. 257-273.

César Mateo et al., Glyoxyl Agarose: A Fully Inert and Hydrophilic Support for Immobilization and High Stabilization of Proteins, Enzyme and Microbial Technology, 39, 2006, pp. 274-280.

Ying Luo et al., A Photolabile Hydrogel for Guided Three-Dimensional Cell Growth and Migration, Nature Materials, vol. 3, Apr. 2004, pp. 249-253.

Michael Mayer et al., Micropatterned Agarose Gels for Stamping Arrays of Proteins and Gradients of Proteins, Proteomics, 4, 2004, pp. 2366-2376.

Sheereen Majd et al., Hydrogel Stamping of Arrays of Supported Lipid Bilayers with Various Lipid Compositions for the Screening of Drug-Membrane and Protein-Membrane Interactions, Angewandte Chemie, 177, 2005, pp. 6855-6858.

Mined Watase et al., Agarose Gels: Effect of Sucrose, Glucose, Urea, and Guanidine Hydrochloride on the Rheological and Thermal Properties, J. Agric. Food Chem., 38, 1990, pp. 1181-1187.

Katsuyoshi Nishinari et al., Effects of Polyhydric Alcohols on Thermal and Rheological Properties of Polysaccharide Gels, Agric. Biol. Chem., 51 (12), 1987, pp. 3231-3238.

Valery Normand et al., Effect of Sucrose on Agarose Gels Mechanical Behaviour, Carbohydrate Polymers, 54, 2003, pp. 83-95.

Amelia Gamini et al., Hydrogen-Bonding and Conformation of Agarose in Methyl Sulfoxide and Aqueous Solutions Investigated by $^1$H and $^{13}$C NMR Spectroscopy, Carbohydrate Research 304, 1997, pp. 293-302.

Tejwant Singh et al., Effect of Sodium Sulfate on the Gelling Behavior of Agarose and Water Structure Inside the Gel Networks, J. Phys. Chem. B, 113, 2009, 2519-2525.

Louise R. Giam et al., Nanoscale Molecular Transport: The case of Dip-Pen Nanolithography, J. Phys. Chem. A, 2009, pp. 3779-3782.

Hung-Ta Wang et al., Toward Conductive Traces: Dip Pen Nanolithography of Silver Nanoparticle-Based Inks, Applied Physics Letters 93, 2008, 143105-1-143105-3.

Joonkyung Jang et al., Self-Assembly of Ink Molecules in Dip Pen Nanolithography: A Diffusion Model, Journal of Chemical Physics, vol. 115, No. 6, Aug. 8, 2001, pp. 2721-2729.

Albena Ivanisevic et al., "Dip-Pen" Nanolithography on Semiconductor Surfaces, J. Am. Chem. Soc., 123, 2001, pp. 7887-7889.

S. L. Beaucage et al., Deoxynucleoside Phosphoramidites—A New Class of Key Intermediates for Deoxpolynucleotide Synthesis, Tetrahedron Letters, vol. 22, No. 20, 1981, pp. 1589-1862.

Lenhert et al, Massively Parallel Dip-Pen Nanolithography of Heterogeneous Supported Phospholipid Multilayer Patterns, Small, 2007, vol. 3(1), pp. 71-75.

PCT/US2008/067231, filed Jun. 17, 2008, International Search Report(5 pages).

PCT/US2008/007498, filed Jun. 17, 2008, International Search Report(6 pages).

Senesi, A., et al., "Agarose-Assisted Dip-Pen Nanolithography of Oligonucleotides and Proteins", Downloaded by Northwestern University on Jul. 31, 2009, pp. A-I. www.acsnano.org.

Search Report and Written Opinion in Singaporean Patent Application No. 200908192-8 mailed Apr. 18, 2011.

* cited by examiner

Figure 1.

| Additive | Concentration Range |
|---|---|
| Tris EDTA | 10 mM Tris, 1 mM EDTA -300 mM Tris, 30 mM EDTA |
| Tris | 10 mM – 300 mM |
| EDTA | 1 mM – 30 mM |
| PBS | 10 mM – 50 mM |
| SDS | 0.05 – 0.25% |
| 1,1,1 Tris (hydroxymethyl) ethane | 10 – 200 mM |
| Glycerol | 10 – 100 mM |
| Tricine | 10 – 300 mM |
| Sucrose | 0.15 – 1.5% |

UNIVERSAL MATRIX

RELATED APPLICATIONS

This application claims priority to U.S. provisional Ser. No. 60/945,164 filed Jun. 20, 2007, and also to U.S. provisional Ser. No. 60/929,314 filed Jun. 21, 2007, and also to U.S. provisional Ser. No. 61/047,642 filed Apr. 24, 2008, all of which are hereby incorporated by reference in their entireties.

FEDERAL FUNDING STATEMENT

Various embodiments described herein were funded by the federal government under the following grants: Air Force Office Scientific Research (AFOSR grant: AFOSR FA9550-05-1-0054) and NSF/NSEC (grant: EEC-0647560). The government has certain rights in the invention.

BACKGROUND

Microarrays and nanoarrays are important commercial developments. The use of microarrayed-patterned biomolecules, such as DNA, proteins, and cells, has led to extensive and significant advances in fields such as geonomics and proteomics, with applications to many areas of medical and biological research; see for example Miller, et al., *Microarray Technology and Its Applications*; Springer; N.Y. (2005). Within current microarray technology, a need exists to decrease spot-size to the nanometer regime, thus increasing the density of combinatorial libraries. This can not only increase the number of interactions one can simultaneously monitor, but also decrease the amount of costly reagents necessary for example to sequence an organism's DNA or screen interactions. With the advent of powerful new nanolithographic methods, such as dip-pen nanolithography (DPN) printing or patterning (see for example Piner et al., *Science*, 283, 661-663 (1999)), there is now the ability to reduce the feature size in such 1-dimensional or 2-dimensional arrays to their physical limit, the size of the structures from which they are made of and the size of the structures they are intended to interrogate; see for example Rosi et al., Nanostructures *Chemical Reviews*, 105, 1547-1562 (2005). Such massive miniaturization not only allows one to increase the density of combinatorial libraries, increase the sensitivity of such structures in the context of a biodiagnostic event, and reduce the required sample analyte volume, but also allows one to carryout studies not possible with the more conventional microarray format.

In order to achieve the potential DPN may offer to the field of patterned biomolecule arrays, simple and/or robust techniques can be developed for the direct-write patterning of biomolecules at the nanometer scale. Also, massively parallel, multiplexed patterning of biomolecules is desirable. Conventional methods of biomolecule patterning by DPN are generally limited to a single ink composition, be it oligonucleotide or protein. Multiple-ink DPN patterns require first patterning a single component biomolecule, then performing a lengthy alignment procedure before patterning a second biomolecule. One prominent technical challenge in creating multiplexed biomolecule patterns deposited in a massively parallel format resulting from the different diffusion rates inherently associated with different biomolecules; see for example Lee et al., *J. Am. Chem. Soc.* 125, 5588-5589 (2003); Lim et al., *Angew. Chem. Int. Ed.* 42, 2309-2312 (2003). Previous advances in this area have been made, but needs yet exist, particularly for commercial applications. One potential limitation is the chemical modification of a tip such as an AFM tip for reproducible tip coating. Different biomolecules may require a specific modification, which can lead to compatibility issues. The second is in the context of parallel DPN printing. Biological molecules can have different transport properties, which can lead to heterogeneous surface features from tip-to-tip, and in some cases, cannot be deposited at all. Finally, denaturation and loss of biological activity potentially can be an issue. In order to bypass these potential limitations, a method that can equalize the transport rates while preserving the biological activity of the molecules is desirable.

SUMMARY

Embodiments provided herein include methods of making, methods of using, devices, compositions, and the like.

One embodiment provides a method that comprises: (i) providing a tip and a substrate surface, (ii) disposing a patterning composition at the end of the tip, (iii) depositing at least some of the patterning composition from the tip to the substrate surface to form a deposit disposed on the substrate surface, wherein the patterning composition comprises at least one patterning species, at least one carrier that is different from the patterning species, and at least one additive different from the patterning species and the carrier.

Another embodiment provides a method for using a chemical additive comprising: co-mixing the additive with a patterning composition comprising at least one patterning species different from the additive and at least one carrier different from the additive and the patterning species to promote patterning of the patterning species when disposed on the end of a tip and deposited onto a substrate surface.

Another embodiment describes a method to control the diffusion rate of biomolecules for direct-write dip-pen nanolithography (DPN) using agarose as a carrier ink. The nature of the agarose gel matrix is modified with a number of different additives, resulting in an additional method to control spot size, besides contact time, humidity or temperature. By selecting an appropriate type and concentration of additive, the diffusion of two or more different biomolecules may be regulated, resulting in similar spot size for two different biomolecule inks, with similar or substantially the same contact time.

BRIEF DESCRIPTION OF THE DRAWINGS

FIG. 1 illustrates additives and their concentration ranges that can be used for accelerating effects of agarose/biomolecule-based Inks.

DETAILED DESCRIPTION

Introduction

Figure 2A:
FIG. 2 provides microscope image of agarose/biomolecule inked AFM tips. (a) Agarose/DNA inked tip without any additives. (b) Agarose/DNA inked tip with 1.5% sucrose additive.

All references cited herein are hereby incorporated by reference in their entirety.

Priority U.S. provisional Ser. No. 60/945,164 filed Jun. 20, 2007, and priority U.S. provisional Ser. No. 60/929,314 filed Jun. 21, 2007, and priority U.S. provisional Ser. No. 61/047,642 filed Apr. 24, 2008, are all hereby incorporated by reference in their entireties including claims, figures, working examples, and other descriptive embodiments.

Copending application U.S. Ser. No. 12/140,780 to Mirkin et al. "Matrix Assisted Ink Transport," filed on same day as present application, is hereby incorporated by reference including figures, claims, working examples, and other descriptive embodiments.

Copending application U.S. Ser. No. 12/213,301 to Mirkin et al. "Universal Matrix," filed on same day as present application, is hereby incorporated by reference including figures, claims, working examples, and other descriptive embodiments.

Herein, a variety of novel approaches are demonstrated. In one embodiment, a polysaccharide and a chemical additive are utilized as part of a patterning composition. The polysaccharide can be for example agarose, while the chemical additive can be for example a hygroscopic molecule such as a carbohydrate such as for example sucrose. For example, the polysaccharide can function as a bio-compatible ink carrier to pattern directly a variety of molecules and species, including biological molecules (e.g., oligonucleotides and proteins) onto a surface with dip-pen nanolithography (DPN) printing, while the chemical additive can function as simultaneously a hygroscopic agent preventing the carrier from drying out and an agent that modifies the physical properties of the carrier.

The use of polysaccharide as an ink carrier is desirable because it allows for a convenient biocompatible environment that can preserve the structure and bioactivity of the biomolecules being delivered. When using the preferred polysaccharide and chemical additive as a part of a patterning composition, surface modification of the AFM tips prior to DPN printing can be carried out if helpful but is optional. Furthermore, the rate of deposition of the embedded biomolecules can be controlled by controlling the diffusion rate of the carrier matrix via selecting a desirable combination of the carrier matrix and the additive. This allows for a simultaneous deposition of different biomolecules at a controllable rate using parallel DPN printing. One can also apply this approach for the delivery of biological molecules that are more difficult to pattern.

DPN printing, including instrumentation, materials, and methods, is generally known in the art. For practice of the various embodiments described herein, lithography, microlithography, and nanolithography instruments, pen arrays, active pens, passive pens, inks, patterning compounds, kits, ink delivery, software, and accessories for direct-write printing and patterning can be obtained from NanoInk, Inc., Chicago, Ill. Softwares include INKCAD and NSCRIPTOR softwares (NanoInk, Chicago, Ill.), providing user interfaces for lithography design and control. E-Chamber can be used for environmental control. Dip Pen Nanolithography™ and DPN™ are trademarks of NanoInk, Inc.

The following patents and co-pending applications related to direct-write printing with use of cantilevers, tips, and patterning compounds are hereby incorporated by reference in their entirety and can be used in the practice of the various embodiments described herein, including inks, patterning compounds, software, ink delivery devices, and the like:

U.S. Pat. No. 6,635,311 to Mirkin et al., which describes fundamental aspects of DPN printing including inks, tips, substrates, and other instrumentation parameters and patterning methods;

U.S. Pat. No. 6,827,979 to Mirkin et al., which further describes fundamental aspects of DPN printing including software control, etching procedures, nanoplotters, and complex and combinatorial array formation.

U.S. patent publication number 2002/0122873 A1 published Sep. 5, 2002 ("Nanolithography Methods and Products Produced Therefor and Produced Thereby"), which describes aperture embodiments and driving force embodiments of DPN printing.

U.S. patent application Ser. No. 10/366,717 to Eby et al., filed Feb. 14, 2003 ("Methods and Apparatus for Aligning Patterns on a Substrate"), which describes alignment methods for DPN printing (published Oct. 2, 2003 as 2003/0185967).

U.S. patent application Ser. No. 10/375,060 to Dupeyrat et al., filed Feb. 28, 2003 ("Nanolithographic Calibration Methods"), which describes calibration methods for DPN printing.

U.S. Patent Publication 2003/0068446, published Apr. 10, 2003 to Mirkin et al. ("Protein and Peptide Nanoarrays"), which describes nanoarrays of proteins and peptides;

U.S. patent application Ser. No. 10/307,515 filed Dec. 2, 2002 to Mirkin et al. ("Direct-Write Nanolithographic Deposition of Nucleic Acids from Nanoscopic Tips"), which describes nucleic acid patterning (PCT/US2002/038252 published Jun. 12, 2003).

U.S. patent application Ser. No. 10/320,721 filed Dec. 17, 2002 to Mirkin et al. ("Patterning of Solid State Features by Direct-Write Nanolithographic Printing"), which describes reactive patterning and sol gel inks (now published Aug. 28, 2003 as 2003/0162004).

U.S. Pat. Nos. 6,642,129 and 6,867,443 to Liu et al. ("Parallel, Individually Addressable Probes for Nanolithography"), describing active pen arrays.

U.S. Patent Publication 2003/0007242, published Jan. 9, 2003 to Schwartz ("Enhanced Scanning Probe Microscope and Nanolithographic Methods Using Same").

U.S. Patent Publication 2003/0005755, published Jan. 9, 2003 to Schwartz ("Enhanced Scanning Probe Microscope").

U.S. patent application Ser. No. 10/637,641 filed Aug. 11, 2003, now published as 2004/0101469, describing catalyst nanostructures and carbon nanotube applications.

U.S. patent application Ser. No. 10/444,061 filed May 23, 2003, now published as 2004/0026681 published Feb. 12, 2004, and US patent publication 2004/0008330 published Jan. 15, 2004, describing printing of proteins and conducting polymers respectively.

U.S. patent application Ser. No. 10/647,430 filed Aug. 26, 2003, now U.S. Pat. No. 7,005,378, describing conductive materials as patterning compounds.

U.S. patent application Ser. No. 10/689,547 filed Oct. 21, 2003, now published as 2004/0175631 on Sep. 9, 2004, describing mask applications including photomask repair.

U.S. patent application Ser. No. 10/705,776 filed Nov. 12, 2003, now published as 2005/0035983 on Feb. 17, 2005, describing microfluidics and ink delivery.

U.S. patent application Ser. No. 10/788,414 filed Mar. 1, 2004, now published as 2005/0009206 on Jan. 13, 2005 describing printing of peptides and proteins.

U.S. patent application Ser. No. 10/893,543 filed Jul. 19, 2004, now published as 2005/0272885 on Dec. 8, 2005, describing ROMP methods and combinatorial arrays.

U.S. patent application Ser. No. 11/056,391 filed Feb. 14, 2005, now published as 2005/0255237 published on Nov. 17, 2005, describing stamp tip or polymer coated tip applications.

U.S. patent application Ser. No. 11/065,694 filed Feb. 25, 2005, now published as 2005/0235869 on Oct. 27, 2005, describing tipless cantilevers and flat panel display applications.

US Patent publication 2006/001,4001 published Jan. 19, 2006 describing etching of nanostructures made by DPN methods.

WO 2004/105046 to Liu & Mirkin published Dec. 2, 2004 describes scanning probes for contact printing US Patent Publication 2007/0129321 to Mirkin describing virus arrays.

See also two dimensional nanoarrays described in, for example, US Patent Publication 2008/0105042 to Mirkin et al., filed Mar. 23, 2007, which is hereby incorporated by reference in its entirety.

All references cited above are incorporated by reference in their entirety, and the teachings therein can be adapted for use with the various embodiments described herein.

DPN methods are also described in Ginger et al., "The Evolution of Dip-Pen Nanolithography," *Angew. Chem. Int. Ed.* 43, 30-45 (2004), including description of high-throughput parallel methods.

Direct write methods, including DPN printing and pattern transfer methods, are described in for example *Direct-Write Technologies, Sensors, Electronics, and Integrated Power Sources*, Pique and Chrisey (Eds) (2002).

The direct-write nanolithography instruments and methods described herein are particularly of interest for use in preparing bioarrays, nanoarrays, and microarrays based on peptides, proteins, nucleic acids, DNA, RNA, viruses, biomolecules, and the like. See, for example, U.S. Pat. No. 6,787,313 for mass fabrication of chips and libraries; U.S. Pat. No. 5,443,791 for automated molecular biology laboratory with pipette tips; U.S. Pat. No. 5,981,733 for apparatus for the automated synthesis of molecular arrays in pharmaceutical applications. Combinatorial arrays can be prepared. See also, for example, U.S. Pat. Nos. 7,008,769; 6,573,369; and 6,998,228 to Henderson et al.

Scanning probe microscopy is reviewed for example in Bottomley, *Anal. Chem.* 70, 425R-475R (1998). Also, scanning probe microscopes are known in the art including probe exchange mechanisms as described in, for example, U.S. Pat. No. 5,705,814 (Digital Instruments).

Patterning compositions can be formulated and adapted for transfer and deposition from the tip to a substrate surface. The compositions can comprise two or more components including one or more polysaccharides, one or more patterning species, and one or more chemical additives. The patterning composition can be formulated to exclude components and amounts of components that would interfere with the deposition process, wherein the patterning composition comprises the ingredients needed to carry out a successful result. Patterning compositions can be dried, partially or fully, on the tip before the deposition step.

If desired, surfactants in an ink formulation can be used. See for example US Patent Publication No. 2006/0242740 to Collier et al., which is hereby incorporated by reference in its entirety.

Patterning Composition—Biomolecule

The patterning composition can be in the form of an ink. It can comprise one or more patterning species. The patterning species can be molecular or particulate or colloid. It can be synthetic or natural. It can be polymeric, oligomeric, or non-polymeric. It can be a small molecule. Biomolecular applications are particular of note. For example, the patterning species can be a biomolecule (wherein water is not a biomolecule). The patterning species can be a biopolymer. The patterning species can comprise polymerized or repeating units of nucleic acid or amino acid units. Patterning species can be for example oligonucleotides, DNA, RNA, protein, peptide, sugar, carbohydrate, and the like. The patterning species can be used such that it is not adapted synthetically for interaction with a substrate surface. For example, it can be a natural species such as for example a natural protein. Alternatively, the patterning species can be used such that it is adapted synthetically for interaction with a substrate surface. For example, an end group can be functionalized to bond to the surface. This can be represented by, for example, R—X or R—$(X)_n$, wherein R is a patterning species that has been functionalized with group X, and n is the number of groups X, which can be for example 1-10, or 1-5, or 1-3.

Non-biological compounds which can serve as patterning species include for example particulate materials, nanostructured materials, organic compounds, inorganic compounds, polymers, synthetic polymers, compounds which chemisorb to metals (e.g., gold) such as thiols and sulfides, and the like.

Protein Molecules

The patterning species can comprise proteinaceous material and proteins and peptides. Proteinaceous materials include for example antibodies, enzymes, and the like.

In the peptide and protein embodiments, the nanoarrays can be prepared comprising various kinds of chemical structures comprising peptide bonds. These include peptides, proteins, oligopeptides, and polypeptides, be they simple or complex. The peptide unit can be in combination with non-peptide units. The protein or peptide can contain a single polypeptide chain or multiple polypeptide chains. Higher molecular weight peptides are preferred in general although lower molecular weight peptides including oligopeptides can be used. The number of peptide bonds in the peptide can be, for example, at least three, ten or less, at least 100, about 100 to about 300, or at least 500.

Proteins are particularly preferred. The protein can be simple or conjugated. Examples of conjugated proteins include, but are not limited to, nucleoproteins, lipoproteins, phosphoproteins, metalloproteins and glycoproteins.

Proteins can be functional when they coexist in a complex with other proteins, polypeptides or peptides. The protein can be a virus, which can be complexes of proteins and nucleic acids, be they of the DNA or RNA types. The protein can be a shell to larger structures such as spheres or rod structures.

Proteins can be globular or fibrous in conformation. The latter are generally tough materials that are typically insoluble in water. They can comprise a polypeptide chain or chains arranged in parallel as in, for example, a fiber. Examples include collagen and elastin. Globular proteins are polypeptides that are tightly folded into spherical or globular shapes and are mostly soluble in aqueous systems. Many enzymes, for example, are globular proteins, as are antibodies, some hormones and transport proteins, such as serum albumin and hemoglobin.

Proteins can be used which have both fibrous and globular properties, like myosin and fibrinogen, which are tough, rod-like structures but are soluble. The proteins can possess more than one polypeptide chain, and can be oligomeric proteins, their individual components being called protomers. The oligomeric proteins usually contain an even number of polypeptide chains, not normally covalently linked to one another. Hemoglobin is an example of an oligomeric protein.

Types of proteins that can be incorporated include, but are not limited to, enzymes, storage proteins, transport proteins, contractile proteins, protective proteins, toxins, hormones, and structural proteins.

Examples of enzymes include, but are not limited to ribonucleases, cytochrome c, lysozymes, proteases, kinases, polymerases, exonucleases, and endonucleases. Enzymes and their binding mechanisms are disclosed, for example, in *Enzyme Structure and Mechanism, 2$^{nd}$ Ed., by Alan Fersht*, 1977, including in Chapter 15 the following enzyme types: dehydrogenases, proteases, ribonucleases, staphyloccal nucleases, lysozymes, carbonic anhydrases, and triosephosphate isomerase.

Examples of storage proteins include, but are not limited to ovalbumin, casein, ferritin, gliadin, and zein.

Examples of transport proteins include, but are not limited to hemoglobin, hemocyanin, myoglobin, serum albumin, β1-lipoprotein, iron-binding globulin, and ceruloplasmin.

Examples of contractile proteins include, but are not limited to myosin, actin, dynein.

Examples of protective proteins include, but are not limited to antibodies, complement proteins, fibrinogen, and thrombin.

Examples of toxins include, but are not limited to, *Clostridium botulinum* toxin, diptheria toxin, cholera toxin proteins, Alexa Fluor 594 modified cholera toxin proteins, snake venoms, and ricin.

Examples of hormones include, but are not limited to, insulin, adrenocorticotrophic hormone and insulin-like growth hormone, and growth hormone.

Examples of structural proteins include, but are not limited to, viral-coat proteins, glycoproteins, membrane-structure proteins, α-keratin, sclerotin, fibroin, collagen, elastin, and mucoproteins.

Natural or synthetic peptides and proteins can be used. Proteins that can be used, for example, are prepared by recombinant methods.

Examples of preferred proteins include immunoglobulins, IgG (rabbit, human, mouse, and the like), Protein A/G, fibrinogen, fibronectin, lysozymes, streptavidin, avidin, ferritin, lectin (Con. A), and BSA. Rabbit IgG and rabbit anti-IgG, bound in sandwich configuration to IgG are useful examples.

Spliceosomes and ribosomes and the like can be used.

A wide variety of proteins are known to those of skill in the art and can be used. See, for instance, Chapter 3, *"Proteins and their Biological Functions: A Survey,"* at pages 55-66 of BIOCHEMISTRY by A. L. Lehninger, 1970, which is incorporated herein by reference.

Additional proteins are described below in the working examples, including labeled proteins and fluorescently labeled proteins. Proteins can include cholera toxin subunit B and trypsin inhibitor.

Nucleic Acid Patterning Species

In nucleic acid embodiments, the nucleic acid is not particularly limited. For example, the nucleic acid can be synthetically made, modified to include, for example, functional groups tailored for chemisorption or covalent bonding to the substrate, as well as naturally occurring. It can be of low, medium, or high molecular weight, oligomeric or polymeric. It can be single-, double-, or even triple-stranded. The nucleic acid can be based on deoxyribonucleic acid (DNA), ribonucleic acid (RNA), or combinations thereof. The structure of nucleic acids is generally described in, for example, Calladine and Drew, *Understanding DNA, The Molecule and How it Works, 2$^{nd}$ Ed.*, 1997.

General types of nucleic acid that can be patterned include, for example, DNA, RNA, PNA, CNA, RNA, HNA, p-RNA, oligonucleotides, oligonucleotides of DNA, oligonucleotides of RNA, primers, A-DNA, B-DNA, Z-DNA, polynucleotides of DNA, polynucleotides of RNA, T-junctions of nucleic acids, domains of non-nucleic acid polymer-nucleic acid block copolymers, and combinations thereof. Additional general types of nucleic acids include, for example, viral RNA or DNA, a gene associated with a disease, bacterial DNA, fungal DNA, nucleic acid from a biological source, nucleic acid which is a product of a polymerase chain reaction amplification, nucleic acid contacted with nanoparticles, and nucleic acid double-stranded and hybridized with the oligonucleotides on the nanoparticles resulting in the production of a triple-stranded complex.

In general, the nucleic acid can be any of a group of organic substances found in cells and viruses that play a central role in the storage and replication of hereditary information and in the expression of this information through protein synthesis. Purines, pyrimidines, carbohydrates, and phosphoric acid generally characterize the fundamental organic substances of a nucleic acid. Purines and pyrimidines are nucleotides, a nucleoside in which the primary hydroxy group of either 2-deoxy-D-ribose or of D-ribose is esterified by orthophosphoric acid. A nucleoside is a compound in which a purine or pyrimidine base is bound via a N-atom to C-1 replacing the hydroxy group of either 2-deoxy-D-ribose or of D-ribose, but without any phosphate groups. The common nucleosides in biological systems are adenosine, guanosine, cytidine, and uridine (which contain ribose) and deoxyadenosine, deoxyguanosine, deoxycytidine and thymidine (which contain deoxyribose). Thus, a purine base may be an adenine nucleotide or a guanine nucleotide. A pyrimidine base may be thymine nucleotide, a cytosine nucleotide, or a uracil nucleotide.

The sequence of a nucleic acid may be random or specific so as to encode a desired amino acid structure. For instance, a group of three nucleotides may comprise a codon. One codon comprises an amino acid. The coding region of a nucleic acid comprises codons.

The nucleic acid can exist freely or can be bound to peptides or proteins to form nucleoproteins in discreet bundles or structured forms such as, for example, chromosomes. A nucleic acid also can exist in single-stranded or double-stranded forms. A nucleic acid may also be linear, circular, or supercoiled. Nucleic acid may be isolated directly from a cell or organelle. A plasmid or cloning vector are also examples of nucleic acids.

The nucleic acid can be made up of nucleotides, each containing a carbohydrate sugar (deoxyribose), a phosphate group, and mixtures of nitrogenous purine- and pyrimidine-bases. The sugar may be of a cyclic or acyclic form. DNA comprises only thymine and cytosine pyrimidines and no uracil. DNA may be isolated from a cell as genomic, nuclear, or mitochondrial DNA, or made synthetically (i.e., by chemical processes).

A gene present in a cell typically comprises genomic DNA made up of exonic and intronic stretches of DNA. The exonic stretches comprises nucleotides that comprise codons that encode amino acids, whereas the intronic stretches of DNA comprise nucleotides that likely do not comprise codons that encode amino acids. The nucleotide sequence of purines and pyrimidines determine the sequences of amino acids in the polypeptide chain of the protein specified by that gene.

DNA may also be isolated as complementary or copy DNA (cDNA) synthesized from an RNA template by the action of RNA-dependent DNA polymerase. For example, the cDNA can be about 100-800 mer strands from PCR amplification. If the RNA template has been processed to remove introns, the cDNA will not be identical to the gene from which the RNA was transcribed. Thus, cDNA may comprise a stretch of nucleotides that are largely exonic in nature.

When in double-stranded form, the two DNA strands form a double helix. In this helix, each nucleotide in one strand is hydrogen bonded to a specific nucleotide on the other strand. Thus, in DNA, adenine bonds with thymine and guanine bonds with cytosine. The ability of nucleotides present in each strand to bind to each other determines that the strands will be complementary, e.g., that for every adenine on one strand there will be a thymine on the other strand.

RNA can be generally similar to DNA, but contains the sugar ribose instead of deoxyribose and the base uracil instead of thymine. RNA can be single-stranded or double-stranded and is transcribed from a cell's DNA. An RNA molecule may form a hairpin loop or other double-stranded structures. RNA may be template RNA, messenger RNA (mRNA), total RNA, or transfer RNA (tRNA). polysome. RNA-DNA hybrid molecules can be deposited according to the present invention. Furthermore, protein-nucleic acids, or "peptide nucleic acids" ("PNA") also may be used.

The binding properties exhibited between complementary nucleotides can make nucleic acids useful as probes that can bind to other nucleic acids. Nucleic acids can be labelled and used as probes. By any one of a number of standard labelling techniques, nucleic acid probes can be used to detect, by hybridization, another nucleic acid. The hybridization can be visualized or detected if the label is, for example, a fluorescent, radioactive, or enzymatic label. Thus, a nucleic acid of the present invention also can be labelled, or modified so as to comprise a detectable entity, like a fluorescent marker or tag, a gold particle, streptavidin, digoxigenin, a magnetic bead, or other markers known to the skilled artisan. See, for example, U.S. Pat. No. 4,626,501 ("Labeled DNA") to Landes, which is hereby incorporated by reference in its entirety.

Nucleotides and nucleic acids also can be modified so that it is protected against nucleic acid degradation. For instance, a nucleic acid may be encapsulated within a liposome.

Alternatively, a thiol group may be incorporated into a polynucleotide, such as into an RNA or DNA molecule, by replacing the phosphorous group of the nucleotide. When so incorporated into the "backbone" of a nucleic acid, a thiol can prevent cleavage of the DNA at that site and, thus, improve the stability of the nucleic acid molecule.

U.S. Pat. No. 5,965,721 to Cook et al. is also incorporated by reference in its entirety, disclosing oligonucleotides, which can be patterned and can have improved nuclease resistance and improved cellular uptake.

Thus, the bioavailability of a nucleic acid treatment in vivo may be improved by modifying the nucleic acid as described. For instance, a modified nucleic acid formulation may have an increased half-life and/or be retained in plasma for longer periods of time than non-modified nucleic acids. A formulation of nucleic acid and polyethylene glycol, for instance, may also increase the half-life of the nucleic acid in vivo, as could any known slow-release nucleic acid formulation. Thus, modifying a nucleic acid may increase the effectiveness of the nucleic acid in vivo and/or its bioavailability.

The size of a nucleic acid can range considerably, from the size of a few nucleotides, to an oligonucleotide, or probe, to a polynucleotide, gene, chromosome fragment to entire chromosomes and genomes. For instance, a single- or double-stranded nucleic acid may be at least 10-, 20-, 30-, 40-, 50-, 60-, 70-, 80-, 90, or 100-nucleotides or base pairs (bp) in length. Larger still, a nucleic acid may be at least 0.2 kb, 0.3 kb, 0.4 kb, 0.5 kb, 0.6 kb, 0.7 kb, 0.8 kb, 0.9 kb, or 1.0 kb in size. Indeed, a nucleic acid for use in the present invention can be at least 1 kb, 2 kb, 3 kb, 4 kb, 5 kb, 6 kb, 7 kb, 8 kb, 9 kb, or 10 kb or larger in size. One preferred size range is 1-2 kb. The nucleic acid can be a chain of varying length of nucleotides and are typically called polynucleotides or oligonucleotides. An oligonucleotide is an oligomer generally resulting from a linear sequences of nucleotides. The oligonucleotide can comprise, for example, about 2 to about 100, about 2 to about 20, about 10 to about 90, or about 15 to about 35 nucleotides. In oligonucleotide arrays, about 25-mer oligonucleotides can be used. Another particular range is about 60- to about 80-mers, which are relatively long oligonucleotides.

Microarray methods, including selection of nucleic acid, probing, labeling, and detection, are described in U.S. Pat. Nos. 6,379,932 and 6,410,231 (Incyte Genomics) and can be used. These patents are incorporated by reference in their entirety. Although these references mention dip pen nanolithographic methods, they do not suggest how or provide guidance on how dip pen nanolithographic methods can be used to make improved nanoarrays as described herein.

A compound comprising a single nucleotide can also be used as ink. Mixtures of nucleic acids can be used, and different spots on an array can comprise different nucleic acids.

A nucleic acid for deposition may be formulated or mixed with other elements prior to, or after direct write deposition onto a substrate surface. Thus, an "ink" of the present invention may comprise other chemicals, compounds, or compositions for deposition onto a substrate surface in addition to a desired nucleic acid sample. Solvent and salt can be used to apply the nucleic acid to the tips. Surfactants can also be used. For instance, proteins, polypeptides, and peptides may be deposited along with a desired nucleic acid onto a substrate surface.

Nucleic acid arrays, and the types of nucleic acids used therein, are described for example in *A Primer of Genome Science*, G. Gibson and S. Muse, 2002, Chapters 3-4 (pages 123-181), which is hereby incorporated by reference. This reference, for example, describes both cDNA microarrays and oligonucleotide arrays, labeling, hybridization, and statistical analysis. cDNA arrays can be used for monitoring the relative levels of expression of thousands of genes simultaneously. PCR-amplified cDNA fragments (ESTs) can be spotted and probed against fluorescently or radioactively labeled cDNA. The intensity of the signal observed can be assumed to be in proportion to the amount of transcript present in the RNA population being studied. Differences in intensity reflect differences in transcript level between treatments. Statistical and bioinformatic analyses can then be performed, usually with the goal of generating hypotheses that may be tested with established molecular biological approaches. Current cDNA microarrays, however, can have an upper limit of 15,000 elements and are unable to represent the complete set of genes present in higher eukaryotic genomes. The advantages and disadvantages of oligonucleotide versus cDNA microarrays are described in the aforementioned *A Primer of Genome Science* and can be used in constructing nucleic acid nanoarrays as described herein.

Oligonucleotides are also described in the working examples hereinbelow including labeled oligonucleotides and fluorolabeled oligonucleotides.

Patterning Composition—Solvent

The patterning composition can comprise one or more solvents. The solvent can be for example water including pure water, distilled water, deionized water, and the like. It can be a buffered solvent. The pH can be varied for the application. The solvent can be one or more organic solvents. Mixtures of solvent compounds can be used. Examples include alcohols, ethers, alkanes, esters, aromatics, as known in the art.

Patterning Composition—Carrier

The patterning composition can comprise one or more carriers. A carrier can function for example to facilitate transport of the patterning species or to encapsulate the patterning species. The carrier can be synthetic or natural, and is preferably hydrophilic. For example, the carrier can be a polysaccharide, and polysaccharides are generally known in the art. See for example Hohinski, Modern Concepts in Biochemistry, 4$^{th}$ Ed., 1983, Chapter 7 (discussing carbohydrates and various saccharides and polysaccharides). For example, polysaccharides can be starch, cellulose, or unbranched polysaccharides such as agarose. Agarose is a naturally occurring polysaccharide gel, which has been demonstrated to be biocompatible, biologically inert, and has low intrinsic florescence; see for example Mateo et al., *Enzyme and Microbial Technology* (2006). It can be obtained from for example seaweed or some species of red algae. Alternatively, it may also be synthesized. It is frequently used as a solidifying agent or supporting medium in microbial culture. It can also be used for gel electrophoresis. It can be for example cast in a tube or slab form.

Figure 7:
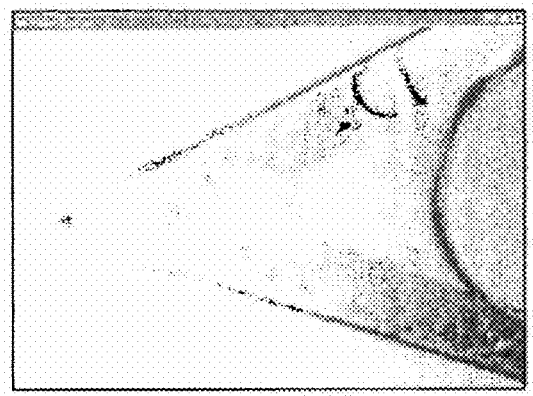
FIG. 7 shows AFM contact mode tips coated with agarose matrix in one embodiment.
Figure 7:
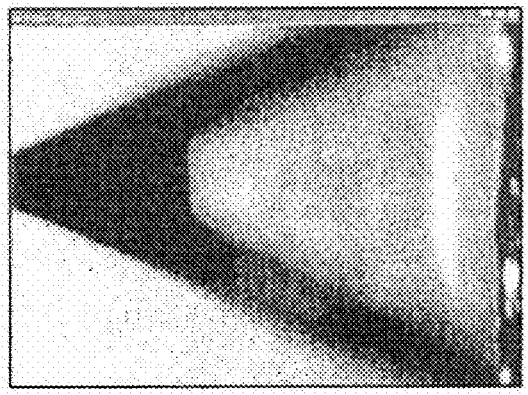
Figure 8:
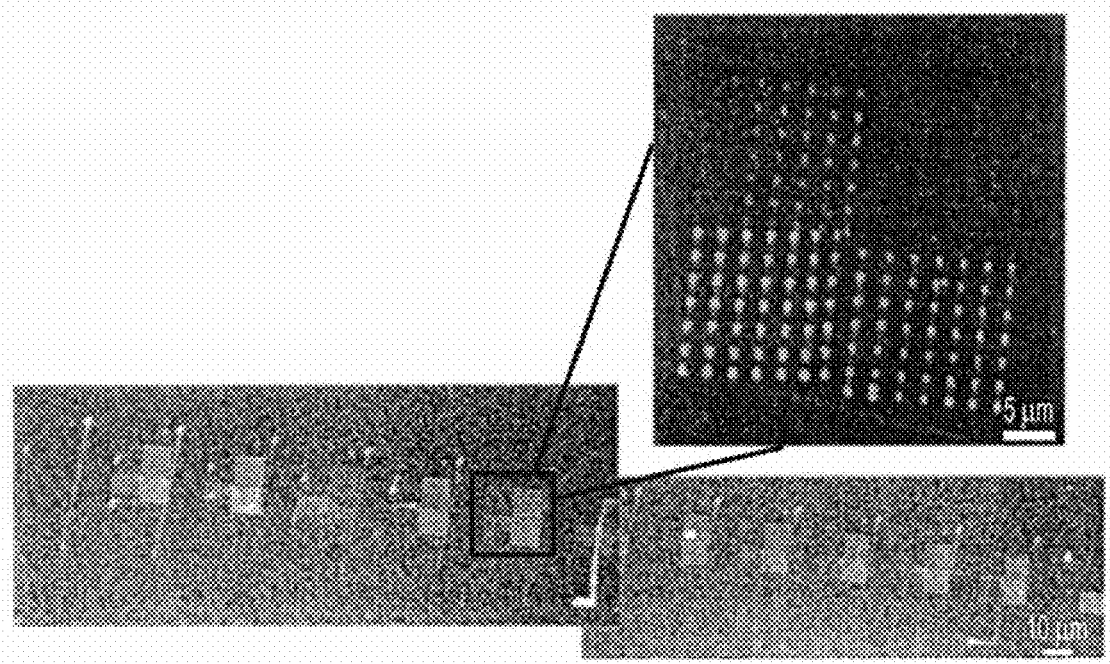
FIG. 8 provides fluorescent microscopy images of Cy3-labeled DN nanoarrays fabricated by DPN multipen-array.

Agarose can undergo a thermo-reversible gelation mechanism, where the gelation temperature is generally about 30° C. This relatively low temperature can allow agarose to be mixed with for example biomolecules while still in the sol state at physiological temperatures. The ratio of agarose to biomolecules can generally be any ratio, such as for example 1:3, 1:1, or 3:1. An agarose matrix used as a carrier can function as a reservoir of the patterning species with the probe and ensures constant delivery of the patterning composition on to the substrate for greater than 480 points per tip (see FIG. 7).

Patterning Composition—Chemical Additive

Chemical additives can be used to control physical and/or chemical properties of the carrier matrix in the patterning composition. In general, hygroscopic materials are preferred as additives, as they can help prevent the carrier from drying out. One attractive feature of the additives is that the additives can modify the properties of the carrier such as the cross-link density of the polymer chain, thereby making the carrier for example less viscous. Without wishing to be bound by any particular theory, an additive such as a carbohydrate such as sucrose can function as an agent to reduce the degree of aggregation in the carrier gel, resulting in for example a smaller correlation length, which can be associated with smaller cross-section radii of the polymer chains in carrier matrix or gel.

For example, tris buffer such as Tris(hydroxymethyl) aminomethane Ethylene Diamine Tetraacetic Acid ("Tris-EDTA") and sucrose both have the effect of breaking up agarose bundles into a finer gel structure; see for example Normand et al., *Carbohydrate Polymers* (2003). These hygroscopic materials also absorb moisture from the air, keeping the agarose gel hydrated. In practice, the use of additives provide a parameter to control the diffusion rate and transport properties of the gel from AFM tip being deposited onto the substrate surface, in addition to parameters such as humidity, temperature and contact time.

The type of additive need not be confined to carbohydrate or a buffer. Any material with the desired properties described above can be used. For example, the additive can be a lipid or a sugar alcohol such as glycerol. Glycerol comprises three hydroxyl groups which upon esterification with one, two or three fatty acids forms monoglycerides, diglycerides and triglycerides respectively. If one of the fatty acids is replaced with a sugar or a phosphate the resulting compound is a glycolipid or a phospholipid respectively. The fatty acids can be unsaturated, saturated, monounsaturated or polyunsaturated.

Tips and Instrumentation

Instrumentation to execute patterning by transferring materials from tip to substrate surface are known in the art. See for example products from NanoInk, Inc. (Skokie, Ill.). See also for example U.S. Pat. Nos. 6,827,979; 6,642,129; 6,867,443; 7,008,769; 6,573,369; and 6,998,228. For example, the tip can be a nanoscopic tip. The tip for example can be a scanning probe microscope tip or an atomic force microscope tip. The tip can be a solid tip; or the tip can be a hollow tip. The hollow tip can comprise an aperature and can delivery flow paths for delivering ink compositions to the end of the tip. The tip can comprise, for example, an inorganic surface or an organic surface. Tips can be made from hard materials through, for example, microfabrication. Sharpening of tips can be carried out.

After tip fabrication, the tip can be used as is, although the tip can be cleaned first when used as is. The tip can be also surface modified if desired after fabrication. For example, an organic coating can be added to an inorganic tip surface.

The tip can comprise a tip surface, including an inorganic tip surface, which has not been modified by organic material.

Tips can be made from materials known in the AFM art, including silicon nitride, silicon, and other hard materials.

The tip can be disposed on a cantilever, as known in the art, including at an end of a cantilever or near the end of a cantilever.

The tips can be if desired relatively long tips having for example a length of at least 5 microns, or at least 10 microns.

The tip can be part of an array of tips, so that a plurality of tips can be provided. For moving in the z-direction with respect to the surface, the tips can move together in a passive mode or can be moved individually in an active or actuated mode. Hence, in the depositing step, the tip can be passively used, or can be used as an actuated tip. The actuation mechanism can be for example thermal or electrostatic or piezoresistive. One-dimensional array of tips can be used; or two-dimensional array of tips can be used. In particular, arrays can be used which have large numbers of tips. See for example U.S. patent application Ser. No. 11/690,738 filed Mar. 23, 2007 to Mirkin et al., which is hereby incorporated by reference in its entirety including the Lenhart *Small* paper (Lenhart et al., *Small* 3, no. 1, 71-75 (2007)).

Instrumentation methods are known in the art to move tips, and tips disposed on cantilevers, in the x, y, and z-directions with respect to the surface.

Instrumentation can be adapted to allow for heating of tips. See for example US Patent Publication No. 2006/0242740 to Sheehan et al.

Substrate and Substrate Surface

A wide variety of substrates can be used which present surfaces for deposition. Substrates can be those used to prepare microarrays in the art. Substrates can be polymeric, glass, ceramic, composite, metal, semiconductor, oxides, silicon, and the like. The substrate can be monolithic, one piece, or can comprise layers disposed on each other. The substrate can comprise an inorganic or an organic surface coating. A monolayer coating can be used. The surface can be functionalized with organic functional groups or organic material. For example, the substrate can comprise an inorganic material surface modified with an organic material. The substrate can be for example a biomolecule.

The substrate surface can be adapted to covalently bond to or chemisorb to one or more components of the patterning composition. For example, the substrate surface can be an electrophilic surface. The substrate surface can be adapted to be reactive with functional groups in the patterning species. For example, amino groups in a protein can react with succinimide. Or a thiol group or compound can chemisorb to gold. For example, aldehyde-modified substrate can also be used as a reactive support for the immobilization of amine-modified or amine-containing biomolecules via imine formation. Once the encapsulated biomolecules are deposited onto the substrate from the ADM tip, the agarose gel matrix can be dried by the exposure to the air and removed by washing with MilliQ water.

If fluorescent detection is used, the substrate and patterning can be adapted to minimize or avoid quenching of the fluorescence.

Substrates can be pre-patterned as needed to provide boundaries for and designate spaces for the deposition zones.

Deposition

The tip and the substrate surface can be moved with respect to each other so that deposition of the patterning composition occurs and material is transferred from the tip to the surface to form a deposit. In some cases, a meniscus may be present to facilitate deposition. The tip the tip is in position for deposition can be controlled as desired.

In some cases, heat can be used to facilitate deposition. Tips and cantilevers supporting tips can be heated, or the environment around the deposition area can be heated. An environmental chamber can be used to control humidity, temperature, atmospheric gases, and other parameters. For example, the deposition can be carried out at a relative humidity sufficient, e.g., sufficiently high, to allow the deposition to occur. In some cases, higher relative humidity may activate or speed up deposition. The deposition can be carried out at a relative humidity of for example at least 30%, or at least 50%, or at least 70%.

If the carrier exhibits a gel-liquid crystal transition temperature, the deposition temperature can be above this temperature, e.g., 10° C. or more above the gel-liquid crystal transition temperature.

The deposition step can be carried out by contacting the tip with the surface, wherein the tip is held stationary in the xy plane with respect to the surface. Alternatively, the deposition step can be carried out by contacting the tip with the surface, wherein the tip is not held stationary in the xy plane with respect to the surface, but rather the tip is moving.

The contact time during the spotting/depositing can vary between for example 7 and 10 seconds, resulting in features of about 200 to 500 nm in diameter. AFM probes that can be used can have a spring constant k ranging from for example about 0.3 to about 2 N/m$^2$. Aldehyde-substrates can be fabricated by vapor deposition of trimethoxysilylalkylaldehyde onto activated glass slides.

If scanning probe instrumentation is used, such as AFM instrumentation, a variety of modes for use can be used including for example contact mode, noncontact mode, or tapping mode or intermittent contact mode.

After a short incubation period in which the gel forms, AFM tips may be immediately coated by directly dipping the tips into the gel-ink, by inkwells, or by placing a drop of the gel-ink on a solid substrate and lowering the tips into the gel by an AFM or other controlled mechanics. The sticky, viscous nature of the agarose gel-ink can allo for minimal to none tip modification for its inking procedures.

Activation and Rate of Deposition

The additive can activate or increase the rate of deposition of the patterning composition comprising a carrier such as agarose. For example, in some embodiments, the patterning composition will not substantially leave the tip without the additive, or the amount leaving the tip may be too small to detect, or take too long to be commercially useful. Detecting deposition can be carried out by for example fluorescence detection or scanning probe methods.

Deposit

The deposit can be formed in a variety of shapes and patterns. A pattern can be found in a single deposit, or in a series of separate deposits. The deposit can be for example a dot or a line. The line can be straight or curved. The deposit can be characterized by a line width or a dot diameter. For example, the dot diameter or the line width can be about 10 nm to about 20 microns, or about 50 nm to about 10 microns, or about 100 nm to less than about one micron.

The deposit can be also characterized by a height. For example, the height can be about 1 nm to about 1 micron, or about 10 nm to about 750 nm, or about 100 nm to about 500 nm.

The distance between deposits can reflect high resolution and can be for example about 50 microns or less, or about 10 microns or less, or about 1 micron or less, or about 15 nm to about ten microns, or about 100 nm to about one micron. The distance between deposit can be measured as an edge-to-edge distance or a distance between center points (e.g., centers of dots).

The deposit can be treated by for example washing to remove one or more components including carrier, patterning species, additives, or a combination thereof. The deposition and washing can be adapted so that the molecules in the patterning composition are not removed. All or substantially all of the carrier can be removed, or if desired some lipid can be retained if washing is adapted accordingly.

Arrays

Also provided herein are articles including arrays, wherein the array comprises a substrate and one or more deposits disposed on the substrate surface. The deposits can be formed by methods described herein.

Applications

Applications include microarrays and nanoarrays, including biological arrays, and the known applications of such arrays. For example, the development of direct patterning and nanopatterning methods for protein-based nanostructures is important for researchers working in the areas of proteomics, and theranostics. Such methods would allow one to generate multi-component biological nanostructures of proteins, oligonucleotides, and viruses. Other applications include the development of biological microarrays and nanoarrays for high-throughput genomic and proteomic analysis, exploring biomolecular interactions on the nanoscale with larger biological entities (i.e. eukaryotic cells, viruses, bacteria, and spores), and for biosensing and medical diagnostics.

NON-LIMITING WORKING EXAMPLES

Figure 2B:
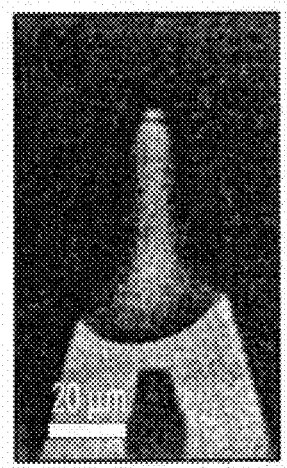

A series of non-limiting working examples are provided.
Materials and Methods
The following materials and techniques were employed in several embodiments of the non-limiting working examples:
Materials
A variety of biomolecules, such as DNA or proteins, were patterned by dip-pen nanolithography on activated glass surfaces (either aldehyde, or NHS activated slides) using the agarose matrix as a carrier ink. The ink comprised a 1:1 mixture of about 0.3% agarose (for a total concentration of about 0.15%) and biomolecules, such as DNA or proteins at various concentrations in different embodiments. A variety of chemical additives were also included in the final ink composition (FIG. 1). The purposes of the chemical additives were at least two-fold. First, they generally comprise hygroscopic materials, which prevent the agarose matrix from drying out on the AFM tip (see FIG. 2). Second, they modify the nature of the agarose gel and thus accelerate the ink diffusion rate from tip to substrate surface. Though only a few chemical additives have been examined, the use of additives to control the diffusion rate may be extended to other chemicals that modify the nature of the agarose matrix.

Oligonucleotides were either purchased from Integrated DNA Technologies, Inc., San Diego, USA or synthesized on an Expidite DNA synthesizer using precursors obtained from Glen Research, USA. The probe sequence employed for DPN studies had the sequence 5'—$NH_2$—$(CH_2)_6$-GTG CAC CTG ACT CCT GTG GAG-Cy3-3'. Probe concentrations were about 15 to about 100 µM. The complimentary sequence was of the form 5'-Cy5-CTC CAC AGG AGT CAG GTG CAC-3'. The random sequence was of the form 5'-Cy5-TCA TAG TGT GGA CCC CTA GCA-3'. Cholera toxin protein Alexa Fluor 594 (1 mg/ml) was purchased from Molecular Probes. Anti-cholera toxin IgG antibodies were purchased from Biodesign International and modified with Alexa Fluor 488 (Molecular Probes). Donkey anti-goat IgG antibodies (Cy5) were obtained from R & D Systems, USA. Tris-EDTA (Sigma) additives were in the concentration range 10 mM Tris, 1 mM EDTA (1×) to 300 mM Tris, 30 mM EDTA (30×). Glycerol (Sigma) additives were used in the range of about 20 to about 100 mM. All buffers and biomolecule solutions were prepared using 18.2 MΩ·cm distilled water (MilliQ). The following chemicals were used as received: Trimethoxysilylalkylaldehyde (United Chemical Technologies, Inc.) agarose low melting (Fisher Biotech, BP1165-25), Tris(hydroxymethyl)amine (Sigma), ethylenediamine-tetraacetic acid (Sigma), 1,1,1 Tris(hydroxymethyl)ethane (Sigma), Tricine buffer solution (Sigma), sucrose (Sigma), ethanolamine (Sigma), Codelink activated glass slides (GE Healthcare).

Modification Glass Slides.
Codelink activated glass slides from GE Healthcare were used as received. These slides have been coated with a 3-D chemistry that comprises a hydrophilic polymer containing amine-reactive groups, which can facilitate attachment of molecules such as protein to the slides. For the aldehyde modification, clean microscope cover glass (Fisher Scientific) was activated in oxygen plasma for 15 minutes, and immediately submitted to vapor deposition of trimethoxysilylalkylaldehyde for 20 minutes. Following monolayer formation, the substrates were rinsed with ethanol to remover any excess silanes and dried with $N_2$.

Ink Preparation
A 0.3% Agarose gel was prepared by dissolving agarose in MilliQ water by heating for 2 minutes in a microwave oven. The gel in sol form was mixed with a solution of biomolecules with or without additives in a 1:1 ratio.
Dip-Pen Nanolithography
DPN was preformed on an NScriptor (Nanoink, Skokie, Ill., USA) in contact mode using multi-pen 1-dimensional array M-tips (spring constant 0.5 N/m) in air at about 60% humidity. Tips were inked in M-tip inkwells by dipping 3-5 times. Dwell times (i.e., time during which the tip remains immersed in the ink) varied from about 0.01 to about 20 s.
Fluorescence Microscopy
Fluorescent images were obtained with a Carl Zeiss, Axiovert 200M epifluorescent microscope.
Hybridization on Substrate Surface
DNA patterns on Codelink slides were allowed to react for a minimum of 8 hours at 50% humidity and washed with PBS (5 minutes) under vigorous agitation and rinsed with water to remove residual agarose. The reaction time can vary, for example in the range of 6 to about 9 hours. These substrates were then blocked with 50 mM ethanolamine in Tris-EDTA at a pH 8 for 1 hour at 50° C. For hybridization, a 5'-Cy5-labeled oligonucleotide was diluted to 1 µM in 4×SSC containing 0.02% SDS and a drop of that solution was applied to the surface of the modified glass slide. A coverslip was mounted gently on the top of the solution, and the substrates were transferred to the hybridization oven at 45° C. for 8 hours. The unhybridized probes were removed by washing with vigorous agitation in a 1×SSC with 0.01% SDS solution for 5 minutes at hybridization temperature, 0.1×SSC with 0.01% SDS for 5 minutes at room temperature, and subsequent washing in water for 5 minutes.
Biorecognition on the Substrate Surface
Protein patterns on Codelink sides were allowed to react for a minimum of 8 hours at 50% humidity and then washed with PBS (5 minutes) under vigorous agitation and rinsed with water to remove residual agarose. Either anti-cholera toxin IgG antibodies (Alexa Fluor 488) or donkey anti-goat (Cy5) was diluted to a concentration of 100 µg/mL in 1×PBS, 1% BSA, 0.25% Tween-20. A drop of this solution was applied to the surface of the substrate and a coverslip gently mounted on top. The substrate was subsequently transferred to an oven at 37° C. for 45 minutes. The un-reacted probes were removed by washing with vigorous agitation in 1×PBS, 1% BSA, 0.25% Tween-20 for 5 minutes at room temperature and thereafter rinsed with water.

Example 1

Effect of Tris-EDTA Buffer on Diffusion Rate

Figure 3A:
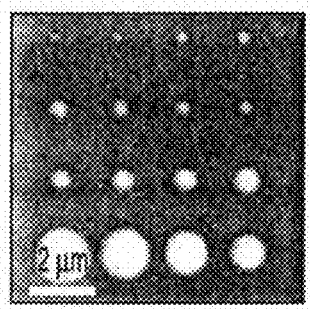
FIG. 3 shows ink diffusion rates of DNA/agarose/Tris-EDTA buffer. A) AFM micrograph of a typical diffusion experiment patterned at 60% humidity with dwell times from 0.01-10 s. B) Corresponding fluorescence image. C) Ink diffusion curves showing difference in diffusion rates between a 30× Tris-EDTA (TE) (300 mM Tris, 30 mM EDTA) and 1×TE (10 mM Tris, 1 mM EDTA).
Figure 3B:
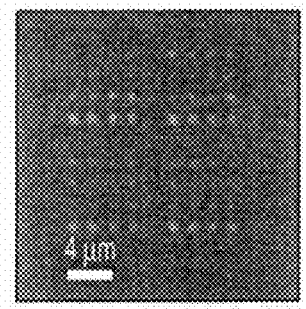
Figure 3C:
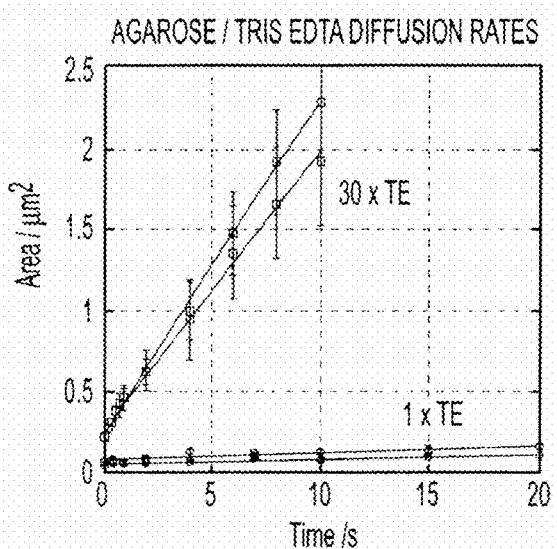

In one embodiment, the diffusion rate may be accelerated by the use of a Tris-EDTA buffer. Without the buffer, a pure DNA/agarose ink was found to be almost immobile, and would not diffuse from the AFM tip to the substrate. The ratio of Tris to EDTA can be of any value. In one embodiment, with a concentration of 10 mM Tris, 1 mM EDTA, the diffusion rate of a DNA/agarose ink was measured to be approximately 0.0035 µm/$s^2$ on aldehyde modified glass substrates. When the concentration of buffer was increased to 300 mM Tris, 30 mM EDTA, the diffusion rate was increased to 0.2 µm/$s^2$ (see FIG. 3) on the same aldehyde modified substrate.

Example 2

Effect of Glycerol on Diffusion Rate

Figure 4:
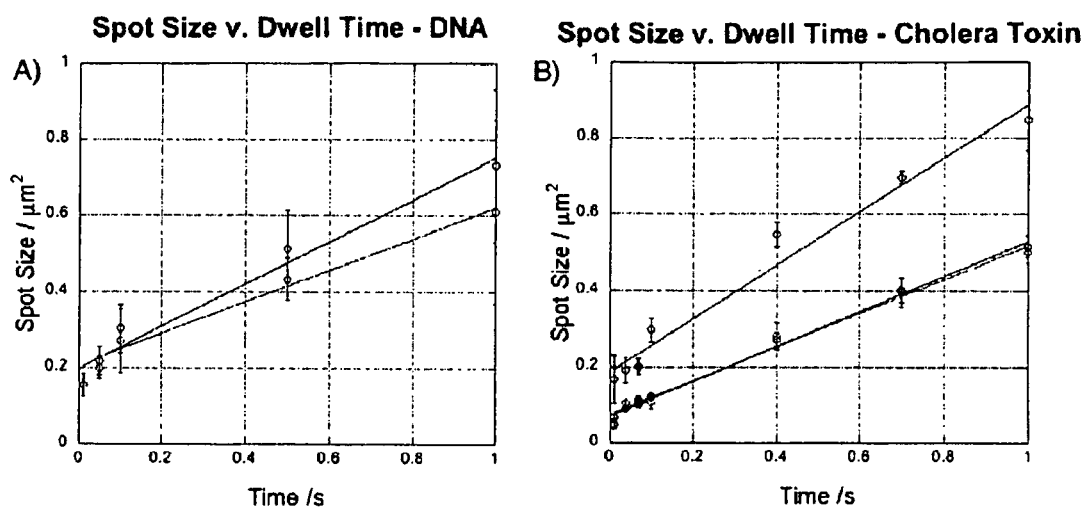
FIG. 4 shows Spot Size vs. Dwell time for DNA/agarose/30 mM Glycerol and cholera toxin protein/agarose/30 mM glycerol inks showing similar diffusion rates for the two inks.

In one embodiment, glycerol was used as an additive in a patterning ink composition for DPN. With no additive, a DNA/agarose ink was not found to diffuse from AFM tip to an NHS activated Codelink glass slide substrate. In contrast, with no additive, a cholera toxin protein/agarose ink was found to migrate from tip to substrate. Thus, the diffusion characteristics of the two inks were different. However, with a 30 mM of glycerol, the diffusion rate of both the DNA/agarose ink and cholera toxin protein/agarose ink were modified to be approximately equal, varying from 0.4-0.7 µm²/s (see FIG. 4).

Example 3

Bioactivity Studies

Figure 5:
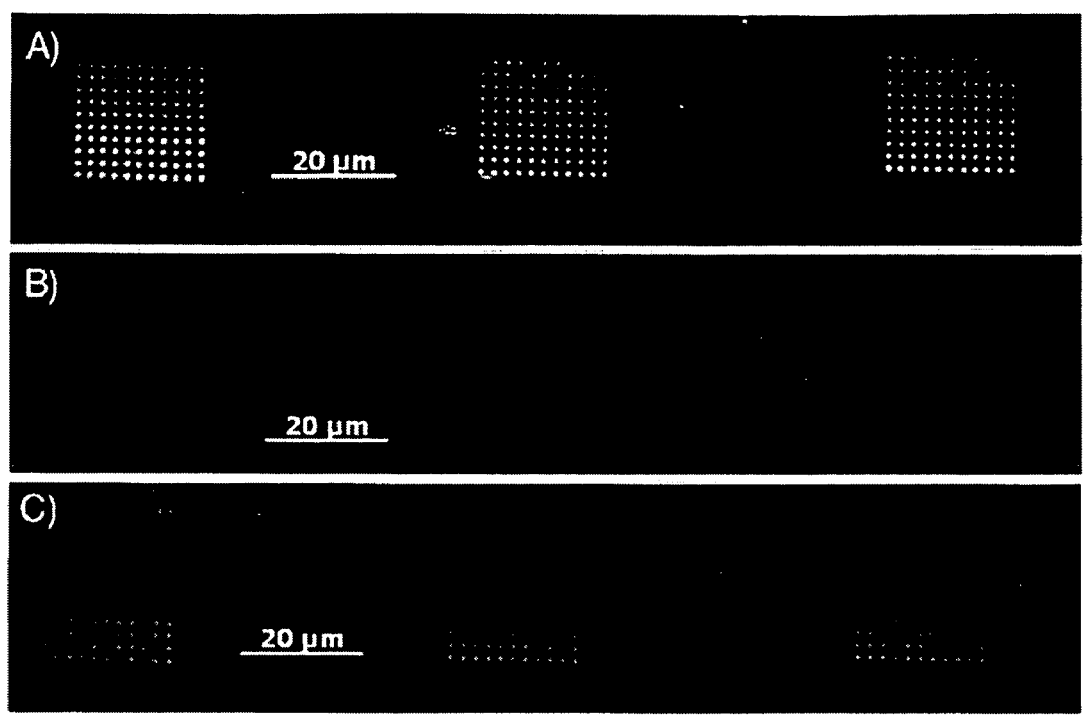
FIG. 5 provides fluorescence micrographs of DNA hybridization. A) Spots of DNA deposited by DPN using a agarose/glycerol ink. B) Negative control after introduction of a noncomplimentary sequence. C) Positive signal showing hybridization with complementary sequence.
Figure 9A:
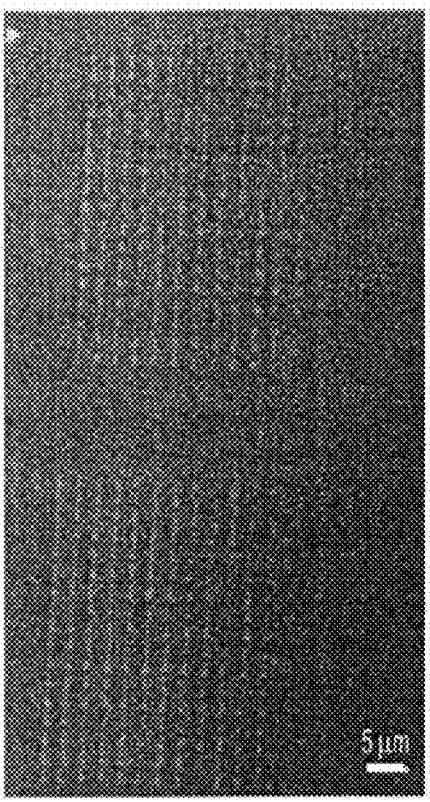
FIG. 9(*a*) and (*b*) show fluorescent microscopy images of Cy3-labelled DNA nanoarrays, each comprise 216 spots, fabricated by DPN multipen-arrays.
Figure 9B:
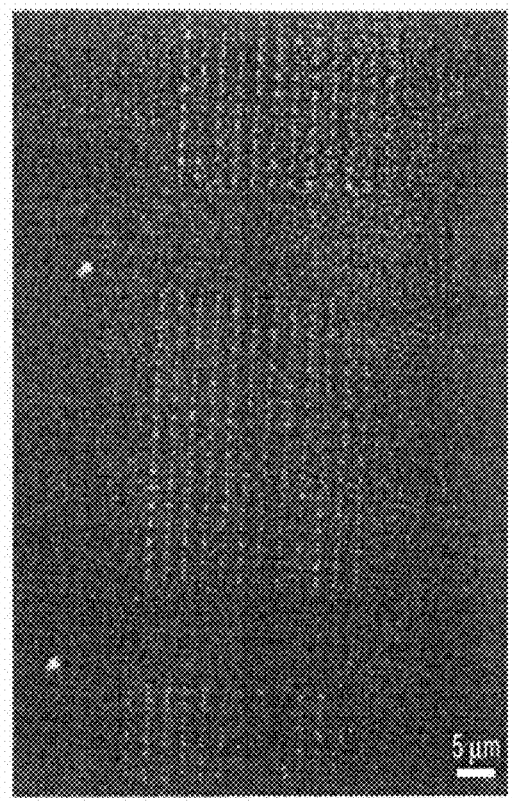

In one embodiment, the bioactivity of oligonucleotides and proteins deposited on Codelink activated glass slide substrates using 30 mM glycerol as an additive in the ink was probed by fluorescence. A single strand of mutant β-globin with a 5' amine and 3' Cy3 fluorophore was spotted onto a Codelink activated glass substrate by DPN (FIG. 5). Fluorescent microscopy images of Cy3-labeled DNA nanoarrays, each comprising 216 spots, can be fabricated by DPN multi-pen-arrays (see FIGS. 9(a) and (b)). After a non-complementary, random sequence oligonucleotide strand with a 5' Cy5 modification was introduced, the Cy3 signal of the immobilized DNA was detected, though no Cy5 signal was observed. The same substrate was then challenged with the complementary sequence modified at the 5' end with Cy5, and a positive signal was clearly detected. Thus, the oligonucleotides in an agarose carrier immobilized on the Codelink activated glass slide and remained bioactive. The negative control with a random sequence showed that the interaction between oligonucleotides spotted using agarose as a carrier ink remains sequence specific, and that there was no interaction between a random oligonucleotide sequence and any residual agarose that may or may not be on the surface.

Figure 6:
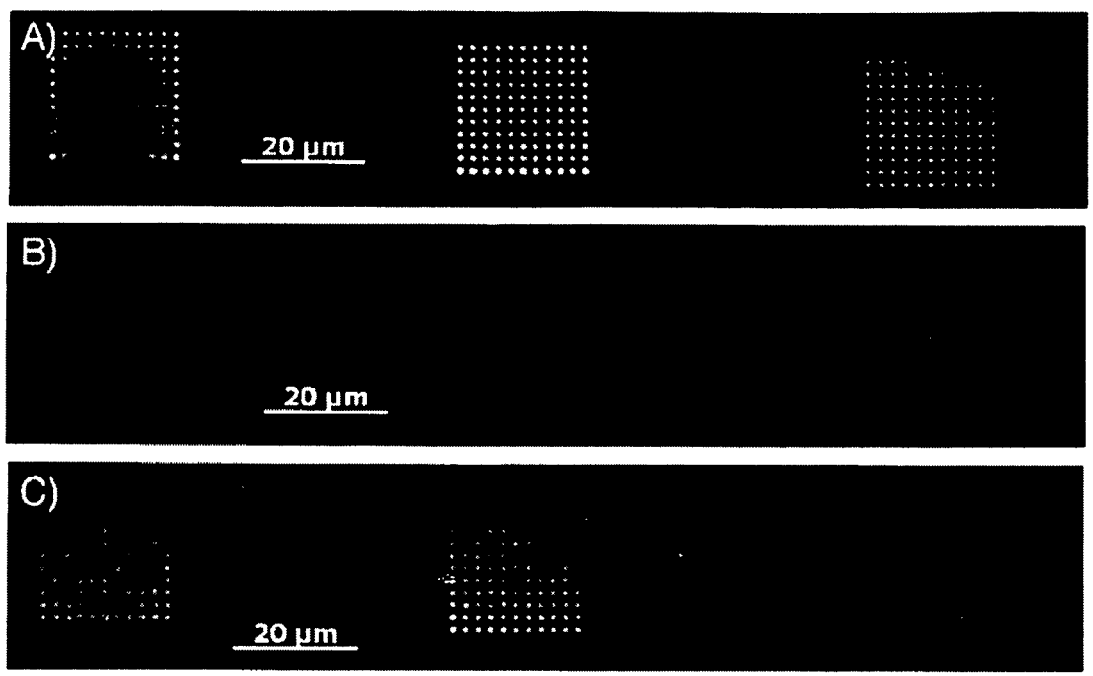
FIG. 6 shows fluorescence micrographs of proteins depicting biorecognition. A) Spots of cholera toxin protein using an agarose/glycerol ink. B) Negative control after introduction of non-cholera toxin reactive Cy 5 labeled IgG antibodies. C) Positive signal showing biorecognition of anti-cholera toxin labeled with Alexa Fluor 488 with immobilized cholera toxin proteins.
Figure 10:
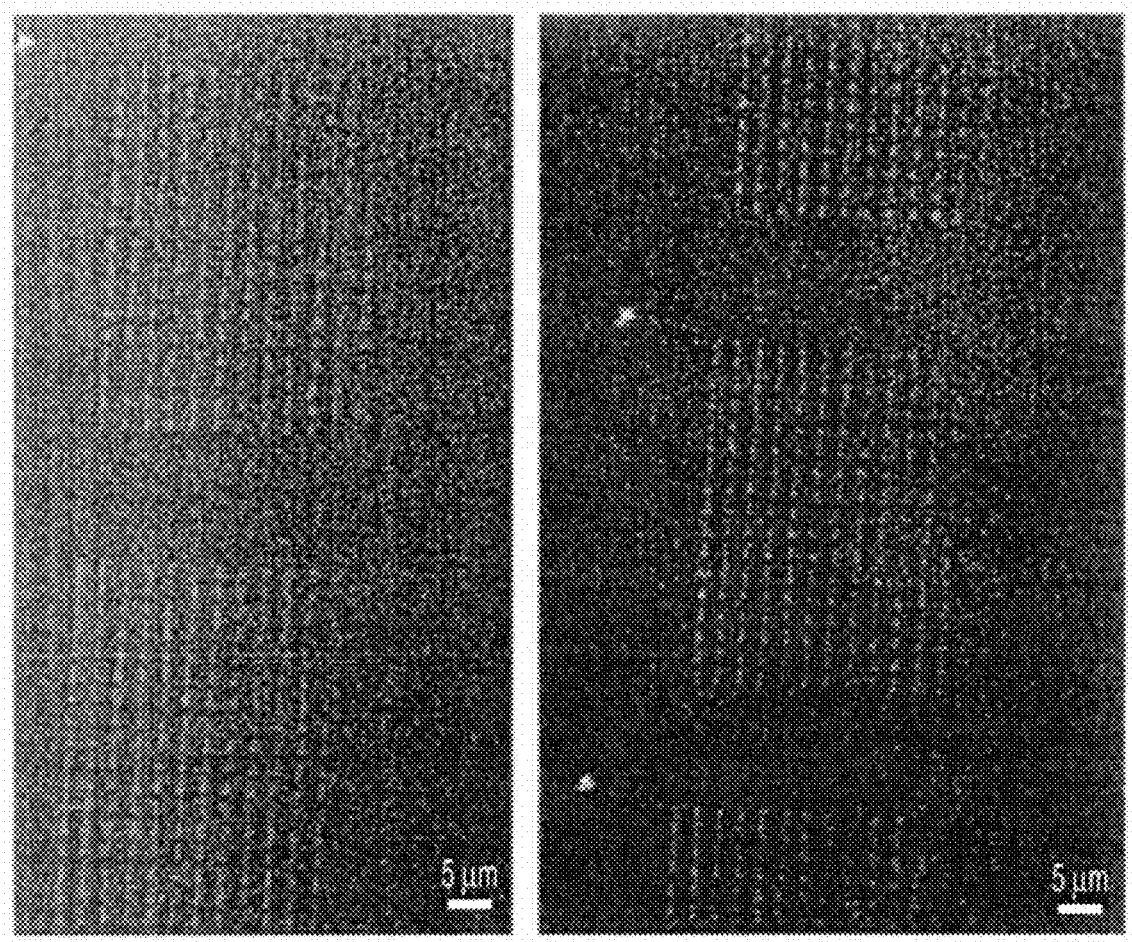
FIG. 10 provides fluorescent microscopy images of cholera toxin protein (Alex 594-labeled) fabricated by DPN multipen array.

In addition, the bioactivity of spotted proteins was probed using the same fluorescence method outlined for DNA. An ink composed of Alexa Fluor 594 modified cholera toxin proteins, agarose, and 30 mM glycerol was deposited onto Codelink activated glass substrates by DPN. Incubation with a Cy5 labeled IgG antibody non-specific towards cholera toxin resulted in a negative control. However, when the same substrate was incubated with Alexa Fluor 488 modified IgG antibodies specific to cholera toxin, a positive signal was observed for both the cholera toxin proteins, and antibodies. Thus, proteins deposited using agarose as a carrier matrix remained active and retained specificity after DPN (see FIG. 6 and FIG. 10).

What is claimed is:

1. A method comprising:
providing a nanoscopic tip and a substrate surface,
disposing a patterning composition at the end of the tip,
contacting the tip with the substrate surface, thereby transferring at least some of the patterning composition from the tip to the substrate surface to form a deposit disposed on the substrate surface, wherein the transfer is carried out at a relative humidity sufficiently high so that the transfer occurs,
wherein the patterning composition comprises at least one patterning species, at least one carrier that is different from the patterning species and comprising polysaccharide, and at least one additive comprising a molecule different from the patterning species and the carrier,
wherein the polysaccharide dominates the rate of deposition of the patterning species, and wherein the additive activates or increases the rate of deposition of the polysaccharide and the patterning species, and
wherein the patterning species comprises a molecule which is to be deposited.

2. The method according to claim 1, wherein the tip is a scanning probe microscope tip.

3. The method according to claim 1, wherein the tip is an atomic force microscope tip.

4. The method according to claim 1, wherein the tip is a solid tip.

5. The method according to claim 1, wherein the tip is a hollow tip.

6. The method according to claim 1, wherein the tip comprises a surface which has not been modified by an organic material.

7. The method according to claim 1, wherein the tip comprises an inorganic surface which has not been modified by an organic material.

8. The method according to claim 1, wherein the tip is on a cantilever.

9. The method according to claim 1, wherein a plurality of tips is provided.

10. The method according to claim 1, wherein a plurality of tips are provided in a one dimensional array of tips.

11. The method according to claim 1, wherein a plurality of tips are provided in a two dimensional array of tips.

12. The method according to claim 1, wherein in the depositing step the tip is passively used.

13. The method according to claim 1, wherein in the depositing step the tip is used as an actuated tip.

14. The method according to claim 1, wherein the substrate surface is adapted to covalently bond to or chemisorb to one or more components of the patterning composition.

15. The method according to claim 1, wherein the substrate surface is an electrophilic surface.

16. The method according to claim 1, wherein the substrate surface is reactive with amino groups.

17. The method according to claim 1, wherein the substrate surface is adapted to chemisorb to a thiol compound.

18. The method according to claim 1, wherein the substrate surface comprises organic material.

19. The method according to claim 1, wherein the substrate is a biomolecule.

20. The method according to claim 1, further comprising a drying step wherein the patterning composition is subjected to drying on the tip.

21. The method according to claim 1, wherein the disposing further comprises dipping the end of the tip into at least some of the patterning composition.

22. The method according to claim 1, wherein the disposing further comprises dipping the end of the tip in at least some of the patterning composition and holding the end of the tip in the composition for between about 0.01 to about 20 seconds.

23. The method according to claim 1, wherein the depositing is carried out at a relative humidity sufficiently high to allow the deposition to occur.

24. The method according to claim 1, wherein the depositing is carried out at a relative humidity of at least 30%.

25. The method according to claim 1, wherein the depositing is carried out at a relative humidity of at least 50%.

26. The method according to claim 1, wherein the depositing is carried out for at least 6 hours.

27. The method according to claim 1, wherein the depositing is carried out for at least 8 hours.

28. The method according to claim 1, wherein the depositing is carried out by contacting the tip with the surface, wherein the tip is held stationary in the XY plane with respect to the surface.

29. The method according to claim 1, wherein the depositing is carried out by contacting the tip with the surface, wherein the tip is moved in the XY plane with respect to the surface.

30. The method according to claim 1, wherein the deposit is a dot or a line.

31. The method according to claim 1, wherein the patterning species is a protein.

32. The method according to claim 1, wherein the patterning species is a DNA molecule.

33. The method according to claim 1, wherein the patterning species is a RNA molecule.

34. The method according to claim 1, wherein the patterning species is an oligonucleotide.

35. The method according to claim 1, wherein the patterning species is a cholera toxin protein.

36. The method according to claim 1, wherein after depositing the patterning species remains bioactive.

37. The method according to claim 1, wherein after depositing the patterning species remains sequence specific.

38. The method according to claim 1, wherein the carrier has no substantial effect on the bioactivity of the patterning species.

39. The method according to claim 1, wherein the carrier is an agarose.

40. The method according to claim 1, wherein the additive is a buffer.

41. The method according to claim 1, wherein the additive is a Tris-EDTA buffer.

42. The method according to claim 1, wherein the additive is a carbohydrate.

43. The method according to claim 1, wherein the additive is a sugar alcohol.

44. The method according to claim 1, wherein the additive is a sucrose.

45. The method according to claim 1, wherein the additive is hygroscopic.

46. The method according to claim 1, wherein the additive is a glycerol.

47. The method according to claim 1, wherein the carrier and the additive together are present substantially at the same amount.

48. The method according to claim 1, wherein the carrier and the additive together amount to about 0.15% of the patterning composition.

49. The method according to claim 1, wherein the additive is 30 mM of glycerol.

50. The method according to claim 1, wherein the additive is 30 mM of Tris-EDTA buffer.

51. The method according to claim 1, wherein the depositing further comprises subsequently washing the substrate to remove residual carrier.

52. A method comprising:
providing an atomic force microscope tip and a substrate surface,
disposing a patterning composition at the end of the atomic force microscope tip, depositing at least some of the patterning composition from the tip to the substrate surface to form a deposit disposed on the substrate surface, wherein the transfer is carried out at a relative humidity sufficiently high so that the transfer occurs,
wherein the patterning composition comprises at least one patterning species, at least one carrier that is different from the patterning species and comprising polysaccharide, and at least one additive comprising a molecule different from the patterning species and the carrier,
wherein the polysaccharide dominates the rate of deposition of the patterning species, and wherein the additive activates or increases of rate of deposition of the polysaccharide and the patterning species and
wherein the patterning species comprises a molecule which is to be deposited.

53. A method comprising:
providing a nanoscopic tip and a substrate surface,
disposing a patterning composition at the end of the tip,
depositing at least some of the patterning composition from the tip to the substrate surface to form a deposit disposed on the substrate surface, wherein the transfer is carried out at a relative humidity sufficiently high so that the transfer occurs
wherein the patterning composition comprises at least one biomolecule, at least one carrier comprising polysaccharide, and at least one additive comprising a molecule different from the biomolecule and the carrier, and
wherein the polysaccharide dominates the rate of deposition of the biomolecule, and wherein the additive activates or increases of rate of deposition of the polysaccharide and the biomolecule.

* * * * *